No. 686,132. Patented Nov. 5, 1901.
W. E. ROCKWOOD.
PROCESS OF MAKING PULLEYS.
(Application filed Nov. 30, 1900.)
(No Model.)
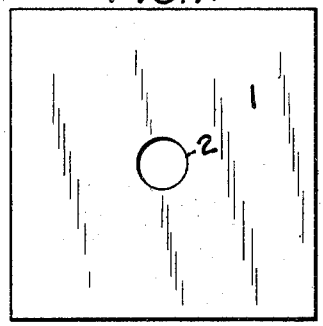
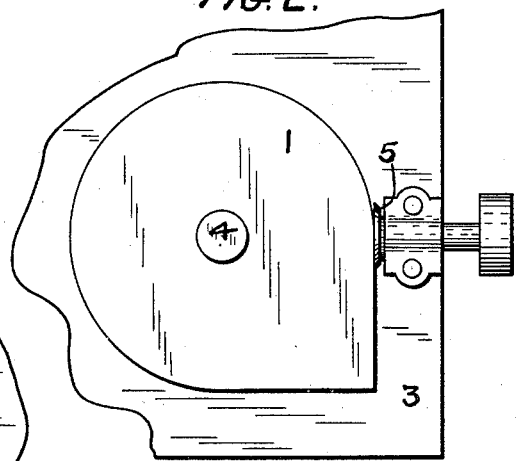
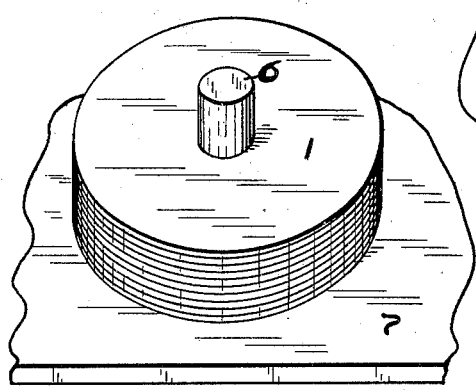
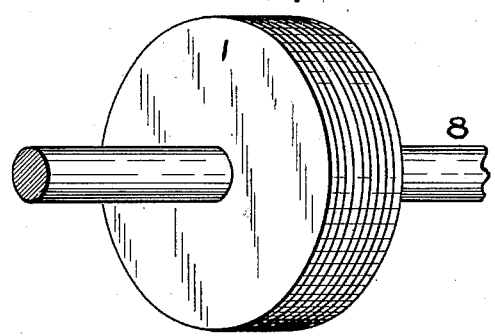
WITNESSES:
G. H. Blaker
Laura Hitt
INVENTOR.
William E. Rockwood
BY V. H. Rockwood
ATTORNEY.

UNITED STATES PATENT OFFICE.

WILLIAM E. ROCKWOOD, OF INDIANAPOLIS, INDIANA.

PROCESS OF MAKING PULLEYS.

SPECIFICATION forming part of Letters Patent No. 686,132, dated November 5, 1901.

Application filed November 30, 1900. Serial No. 38,168. (No model.)

*To all whom it may concern:*

Be it known that I, WILLIAM E. ROCKWOOD, of Indianapolis, county of Marion, and State of Indiana, have invented a certain new and useful Process of Making Pulleys; and I do hereby declare that the following is a full, clear, and exact description thereof, reference being had to the accompanying drawings, in which like figures refer to like parts.

The object of this invention is to facilitate and cheapen the manufacture of pulleys, wheels, and the like made of paper-board and similar material.

Broadly speaking, this invention consists in first making a hole in substantially the center of a sheet of paper-board, the sheet being usually square when purchased, then cutting the periphery of the sheet circular and concentric with the hole in the center by holding the sheet at the center while cutting the periphery, then holding the sheets on each other for gluing and pressing them together and drying by means extending through the sheets of paper, preferably through the holes in the center.

The method of manufacture prior to this invention consisted in holding the square sheets of paper-board by external means pressing against the outside edges or the sides thereof. The paper-board was thus held not only while the circular periphery was being cut, but also during the gluing process. While drying in the old process the sheets of paper rested vertically upon their edges, and the edges were injured.

The full nature of this invention will be understood from the accompanying drawings and the following description and claim.

In the drawings, Figure 1 is a plan of the sheet of paper-board after the central hole has been made. Fig. 2 is a plan of the sheet while the periphery thereof is being cut. Fig. 3 is a perspective of a number of sheets while being glued together. Fig. 4 is a perspective of some of the sheets while being dried.

In carrying out this new process for making pulleys out of a number of sheets of paper-board or similar material placed side by side the square sheet of paper-board 1 is centrally provided with a round aperture or hole 2. This hole may be made by a circular punch or any other suitable means. Then the sheets are taken singly and the periphery made circular concentric with the hole 2. This may be done by any suitable means; but the better way is to place the board on a support 3, with the pin 4 extending up from the support through the hole 2 loosely, so that the board can readily turn thereon. The periphery is then cut by a pair of rotary knives 5, driven by any suitable means. The board will be rotated by the knives while the periphery is being cut, and the periphery will then be concentric with the hole 2. After the sheets of paper-board or similar material have been prepared in the manner described they are separately treated with glue or paste and piled in groups about a pin 6, which extends up from a suitable support 7, the groups of sheets being separated by dry sheets placed between the groups. To more perfectly unite the sheets, they are placed with pin 6 in a suitable press and the required amount of pressure applied, as has been done before this invention. The value of the central hole through the sheets in this process is that by the aid of the pin 6, the sheets are held securely in proper position relatively to each other and are prevented from slipping while being pressed. This gives to the pulley a substantially smooth surface which requires very little trimming to put it in a merchantable condition. After the sheets are glued together in groups they are placed in a suitable drying-rack and mounted on rods extending through the central hole, whereby they can be easily handled and centrally supported. In the handling and drying the edges are not injured, as the material is supported from the center.

The further steps in the manufacture of pulleys made of paper-board or similar material need not be set forth here, as they form no part of this invention, this invention being confined to the process of preparing the paper-board for a pulley.

What I claim as my invention, and desire to secure by Letters Patent, is—

The process of manufacturing pulleys, wheels and the like from sheets of paper-board or similar material which process consists in making a hole in the sheets of material for supporting and holding them, cutting them circular concentric with said hole, applying adhesive material to them, placing them upon each other and holding them with their central holes registering with each other, applying pressure to them while so held to secure them together, and drying them when thus combined.

In witness whereof I have hereunto affixed my signature in the presence of the witnesses herein named.

WILLIAM E. ROCKWOOD.

Witnesses:
V. H. LOCKWOOD,
LAURA HITT.